United States Patent [19]
Morell et al.

[11] Patent Number: 5,518,655
[45] Date of Patent: May 21, 1996

[54] PHOSPHOR MATERIAL BASED ON MANGANESE-DOPED ZINC SILICATE AND METHOD FOR OBTAINING SUCH A MATERIAL

[75] Inventors: Antoinette Morell, Villebon S/Yvette; Nathalie Goumard, Paris, both of France

[73] Assignee: Thomson-CSF, Puteaux, France

[21] Appl. No.: 433,032

[22] Filed: May 3, 1995

Related U.S. Application Data

[63] Continuation of Ser. No. 224,187, Apr. 7, 1994, abandoned, which is a continuation of Ser. No. 896,973, Jun. 11, 1992, abandoned.

[30] Foreign Application Priority Data

Jun. 11, 1991 [FR] France .................................... 91 07075

[51] Int. Cl.$^6$ ............................. C09K 11/59; C09K 11/68
[52] U.S. Cl. ............................... 252/301.4 F; 252/301.6 F
[58] Field of Search ........................... 252/301.47, 301.67

[56] References Cited

U.S. PATENT DOCUMENTS

| | | | |
|---|---|---|---|
| 3,541,019 | 11/1970 | Glemza et al. | 252/301.6 F |
| 3,586,635 | 6/1971 | Vanik et al. | 252/301.6 F |
| 4,728,459 | 3/1988 | Fan et al. | 252/301.6 F |

FOREIGN PATENT DOCUMENTS

| | | |
|---|---|---|
| 0257554 | 3/1988 | European Pat. Off. . |
| 0377123 | 7/1990 | European Pat. Off. . |

*Primary Examiner*—Melissa Bonner
*Attorney, Agent, or Firm*—Oblon, Spivak, McClelland, Maier & Neustadt

[57] ABSTRACT

A phosphor material based on manganese-doped zinc silicate, in which the manganese doping level ranges from 3.5% to 25%, can be used to obtain a very short time of decay after excitation.

8 Claims, 6 Drawing Sheets

PHOSPHOR MATERIAL BASED ON MANGANESE-DOPED ZINC SILICATE AND METHOD FOR OBTAINING SUCH A MATERIAL

This application is a Continuation of application Ser. No. 08/224,187, filed on Apr. 7, 1994, now abandoned, which is a Continuation of application Ser. No. 07/896,973, filed on Jun. 11, 1992, also abandoned.

BACKGROUND OF THE INVENTION

1. Field of the Invention

The invention relates to a material based on manganese-doped zinc silicate and, more particularly, to a phosphor material with a short decay time that can be applied notably in displays. The invention also relates to a method for the obtaining of this material.

2. Description of the Prior Art

Known phosphors include manganese-doped zinc silicate $Zn_2SiO_4$:Mn which has been known for several years under the trade name of P1. Under photon or electron excitation, P1 emits a highly saturated green light. Furthermore, its high luminous output, associated with its resistance to marking under the impact of the exciting beam, make it a choice phosphor for display. The P1 phosphor is much used in avionics for HUD or HDD (head-up display or head-down display) visors and in plasma panels.

The phosphors known to date have a manganese doping level lower than or equal to 3.5%. This doping level is represented by x in the general chemical formula:

$$Zn_{2-x}Mn_xSiO_4$$

Phosphors of this type have been described in the document EP 123 947 as well as in the article by A. L. N. STEVELS et al, "Fine Structure in the Low Temperature Luminescence of $Zn_2SiO_4$:Mn and $Mg_4Ta_2O_9$:Mn" in *Journal of Luminescence* 8 (1974) - 443–451. However, the materials described have only a low level of manganese doping. These materials have the advantage wherein, under excitation, they emit a green radiation that is very highly saturated, hence shows very high luminosity.

It has been noted that these materials have a substantial decay time (extinguishing time) that can go up to 25 ms, which is a drawback in certain display applications. However, it is preferred to keep a low level of manganese doping in order to be assured of obtaining high luminous output.

SUMMARY OF THE INVENTION

The invention therefore relates to a phosphor material based on manganese-doped zinc silicate ($Zn_2SiO_4$:Mn) wherein the manganese doping level ranges from 3.5% to 25%.

The invention also relates to a method for the making of a phosphor material comprising the following steps:

the mixing, in an aqueous medium, of zinc oxide ZnO, silica gel $SiO_2$ and manganese carbonate $MnCO_3$ in determined proportions;

the drying of the aqueous suspension obtained;

the treatment of the dry matter obtained in the oven at a temperature that is a function of the manganese content in the mixture, this temperature being relatively low for a high manganese content.

BRIEF DESCRIPTION OF THE DRAWINGS

The different objects and features of the invention shall appear more clearly from the following description, given by way of an example with reference to the appended figures, of which.

DETAILED DESCRIPTION OF THE INVENTION

The invention therefore relates to a phosphor material based on manganese-doped zinc silicate having a short decay time. The manganese-doped zinc silicate has the formula:

$$Zn_{2-x}Mn_xSiO_4$$

According to the invention, the manganese doping is such that the doping level meets the following conditions:

$$3.5\% < x < 25\%$$

Figure 1:
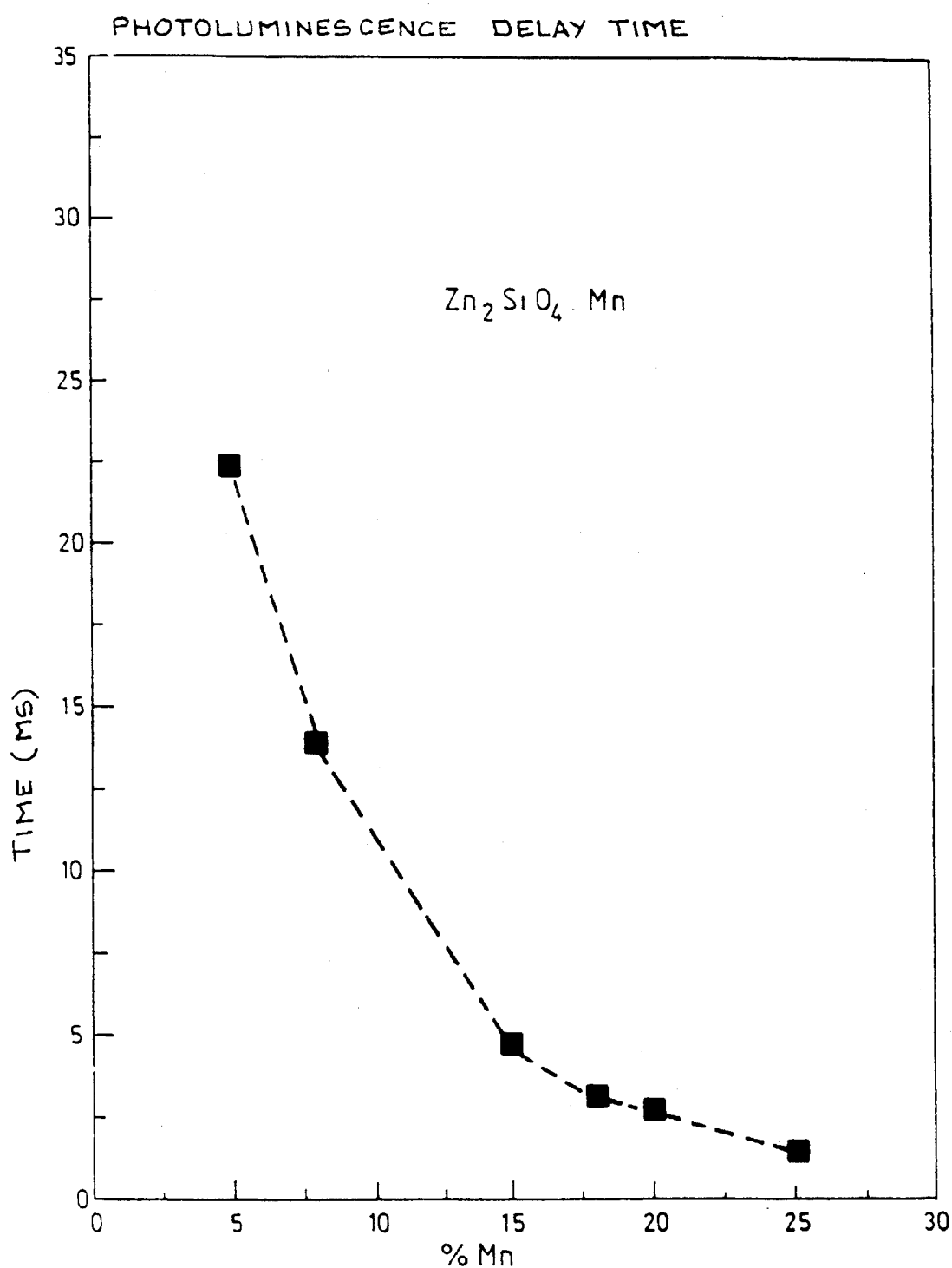
FIG. 1 shows a curve representing the decay times obtained as a function of the doping of the material.

A study of behavior in photoluminescent mode has revealed the fact that the choosing of a relatively high doping level, i.e. one ranging from 3.5% to 25%, gives a relatively short time of decay of emission of the material, after the excitation has been stopped. More particularly, a manganese doping level of 15% to 25% gives a significant advantage. In the context of the examples that shall be described hereinafter, it has been assumed that the decay time corresponds to the period of time at the end of which the luminous output is equal to one-tenth of its initial value after the excitation has ceased. The curve of FIG. 1 brings out the fact that the decay time diminishes when the doping increases. In the curve of FIG. 1 it is seen notably that a manganese doping level of 20% can be used to obtain a decay time in the region of 3 ms, a feature that is considerably promising in display applications. Studies of behavior in cathodoluminescent mode have made it possible to highlight the fact that the decay times are even shorter than during operation in photoluminescent mode. It is thus that, with a doping level of 25%, a decay time of 1.9 ms is obtained in photoluminescence and a decay time of 0.7 ms is obtained in cathodoluminescence.

Figure 2:
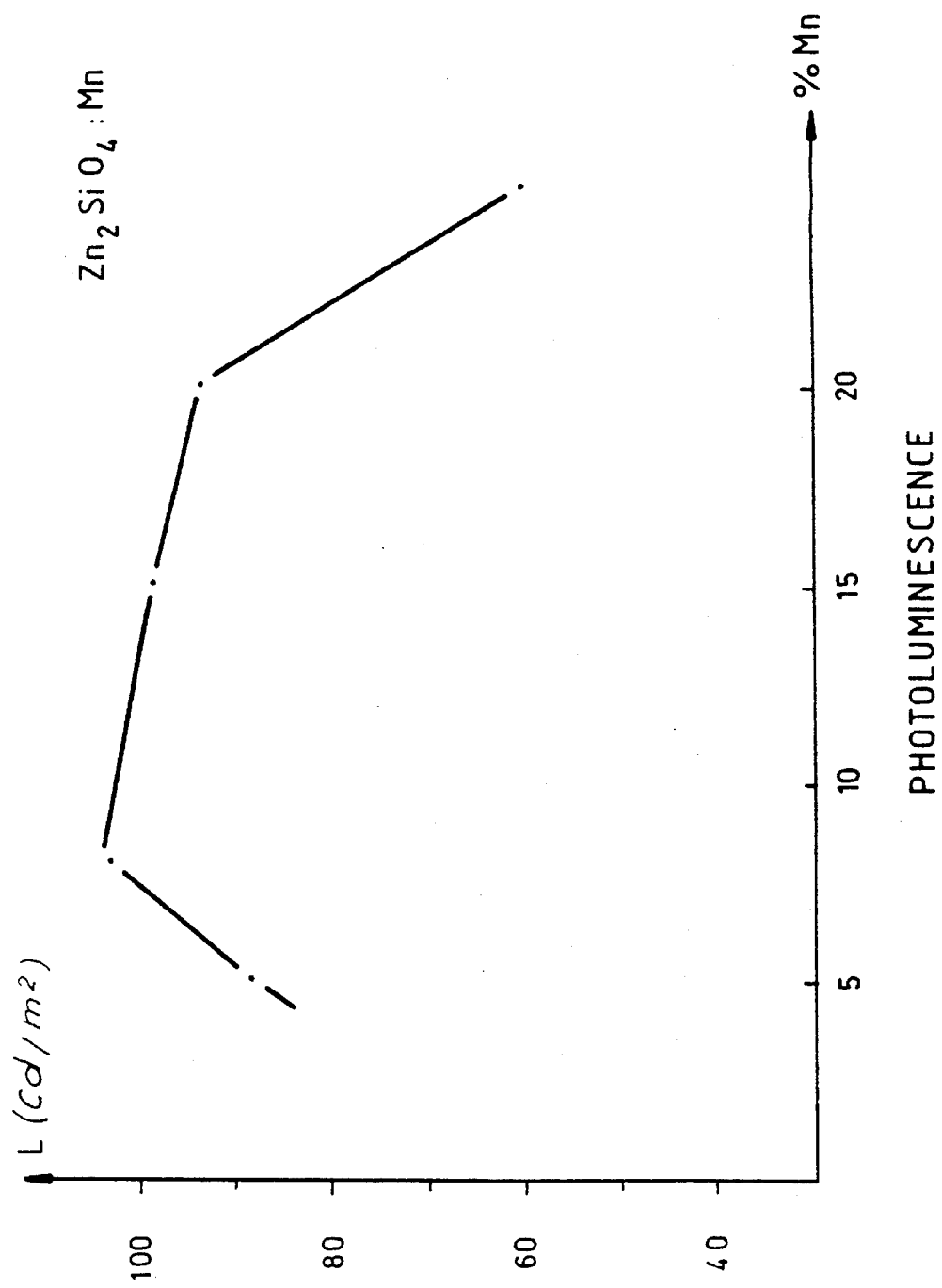
FIG. 2 shows a curve representing the luminance obtained as a function of the doping of the material.

Measurements of luminance under photon excitation, ($\lambda=265$ nm) as a function of the manganese doping level are shown in FIG. 2. It is observed that the luminance is the maximum for a doping level of the order of 8%. However, at 25%, the luminance is still very high.

Figure 3:
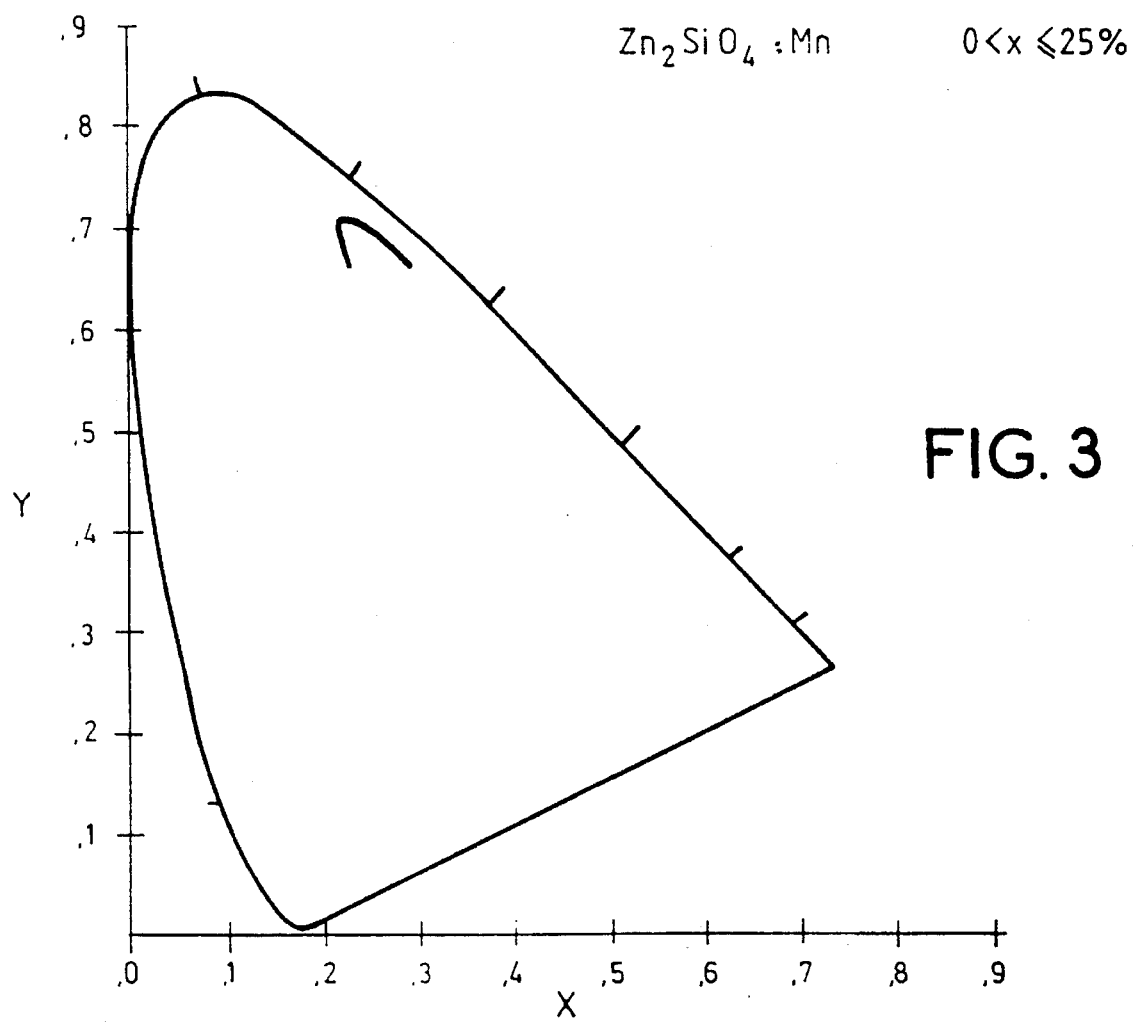
FIGS. 3 and 4 show the trichromatic coordinates as a function of the doping.

The trichromatic coordinates X and Y can be used to define the color of the light emission in the CIE chromaticity diagram. They are related to the visual impression on the retina and are therefore real and direct measurements of color. The changing values of X and Y for the doping levels studied are shown in FIG. 3.

Figure 4:
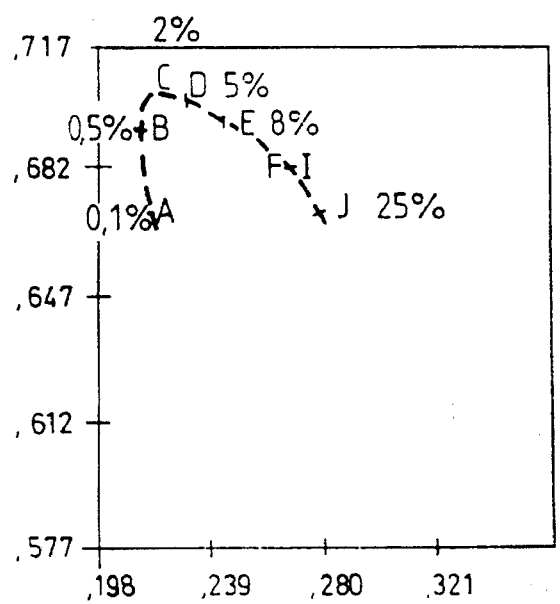

FIG. 4 shows an enlarged view of these changing values of X and Y.

It is therefore possible to modify the color of the transmission in a wide range of values by bringing the doping levels into play.

The examples given here below illustrate the shape of the curves obtained with a $Zn_{2-x}Mn_xSiO_4$ material.

EXAMPLE 1

* Doping with x=5%
* Oven temperature: 1300° C. - 4h
* L:88 Cd/m2
* Decay time: 22 ms in photoluminescence.

EXAMPLE 2

* Doping with x=8%
* Oven temperature: 1300° C. - 4h
* L:103 Cd/m2
* Decay time: 14 ms in photoluminescence.

EXAMPLE 3

* Doping with x=15%
* Oven temperature: 1280° C. - 4h
* L:98 Cd/m2
* Decay time: 5.00 ms in photoluminescence.

EXAMPLE 4

* Doping with x=20%
* Oven temperature: 1200° C. - 4h
* L:94 Cd/m2
* Decay time: 3.5 ms in photoluminescence.

EXAMPLE 5

* Doping with x=25%
* Oven temperature: 1150° C. - 4h
* L:59 Cd/m2
* Decay time:1.9 ms in photoluminescence.

As already mentioned here above, the decay times in cathodoluminescent operation are even shorter. It is thus, for example, that the following decay times were measured in cathodoluminescent operation:

* 3.2 ms with x=15%
* 1.8 ms with x=20%
* 0.7 ms with x=25%

A method for obtaining the materials according to the invention shall now be described.

These compositions are synthesized by the mixing, in an aqueous medium, of zinc oxide ZnO, silica gel $SiO_2$ and manganese carbonate $MnCO_3$ in the proportions required by the chemical formula for the various levels of manganese.

For example, to obtain manganese percentages of 5%, 8%, 15%, 20%, and 25%, the following compositions are required for one mole of $Zn_2SiO_4$: Mn:

| Mn | ZnO (g) | $MnCO_3$ (g) | $SiO_2$ (g) |
| --- | --- | --- | --- |
| 5% | 158.7% | 5.7 | 60.1 |
| 8% | 156.2% | 9.2 | 60.1 |
| 15% | 150.5% | 17.2 | 60.1 |
| 20% | 146.5% | 23.0 | 60.1 |
| 25% | 142.4% | 28.7 | 60.1 |

The mixtures are shaken for about four hours. After the drying of the aqueous suspensions of the raw materials followed by screening, the various mixtures are placed in alumina crucibles with lids, the crucibles themselves being placed in an oven. The heat treatment of the mixtures provides for the formation of a single phase. The profile of this treatment is adapted to each composition so that, after oven treatment, a powder is obtained and not a hard, compact block. In order to keep the Mn ion in the divalent state, the oven treatment operations are done in a neutral atmosphere under nitrogen flux.

The criterion used to determine the optimum temperature of oven treatment is the measurement of the luminance L, expressed in Candela/m2 (Cd/m2) of the phosphor powders. The aim is to obtain the highest possible values of L.

Figure 5:
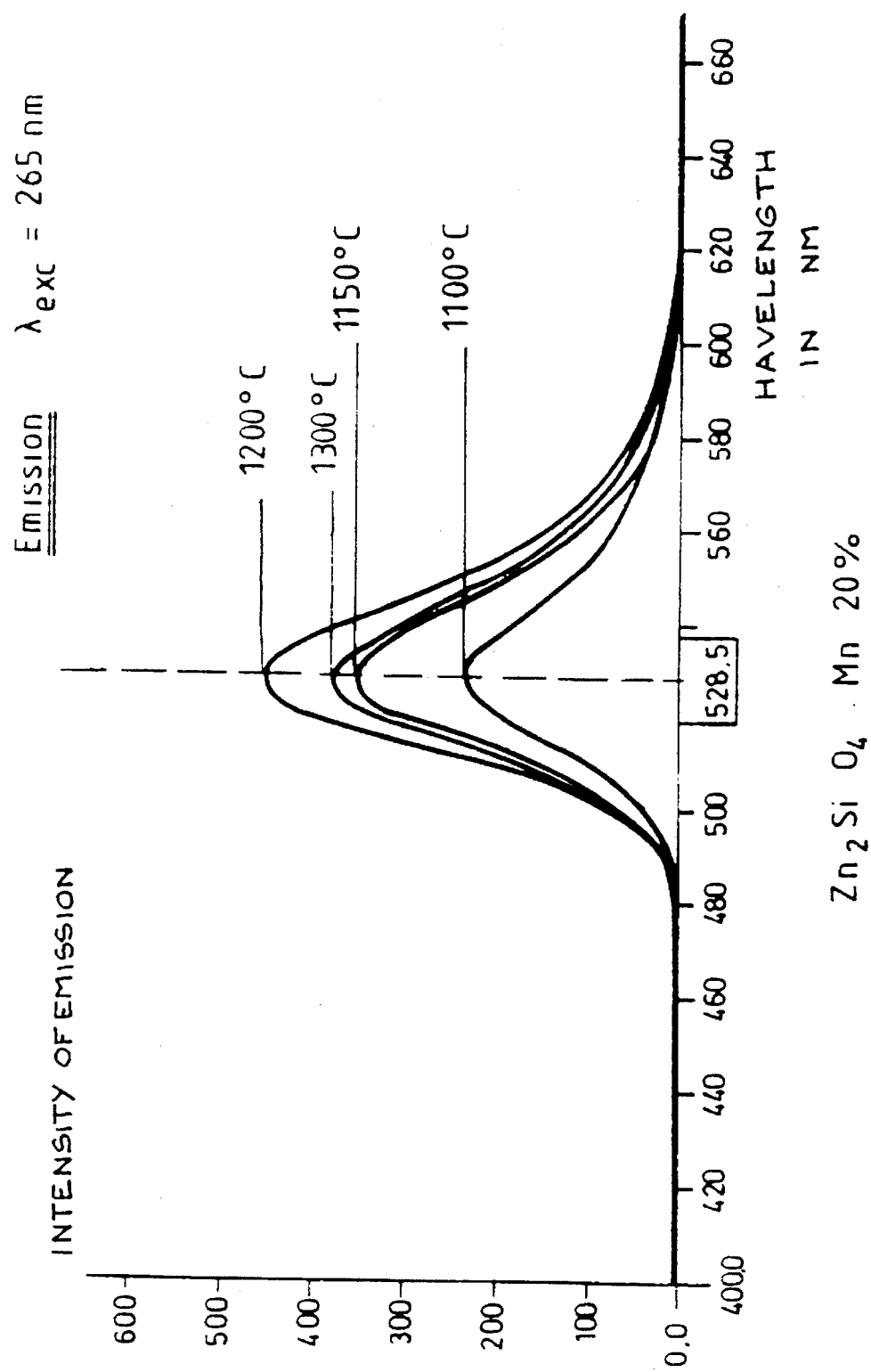
FIG. 5 shows curves that can be used to study the changes in the emission spectrum of Mn doped $Zn_2SiO_4$ for different temperatures of oven treatment.

FIG. 5 shows the development of the emission spectrum of $Zn_2SiO_4$ doped with 20% of manganese. For this doping level, the maximum luminance L is obtained on the phosphor powder subjected to heat treatment at 1200° C. for four hours.

Figure 6:
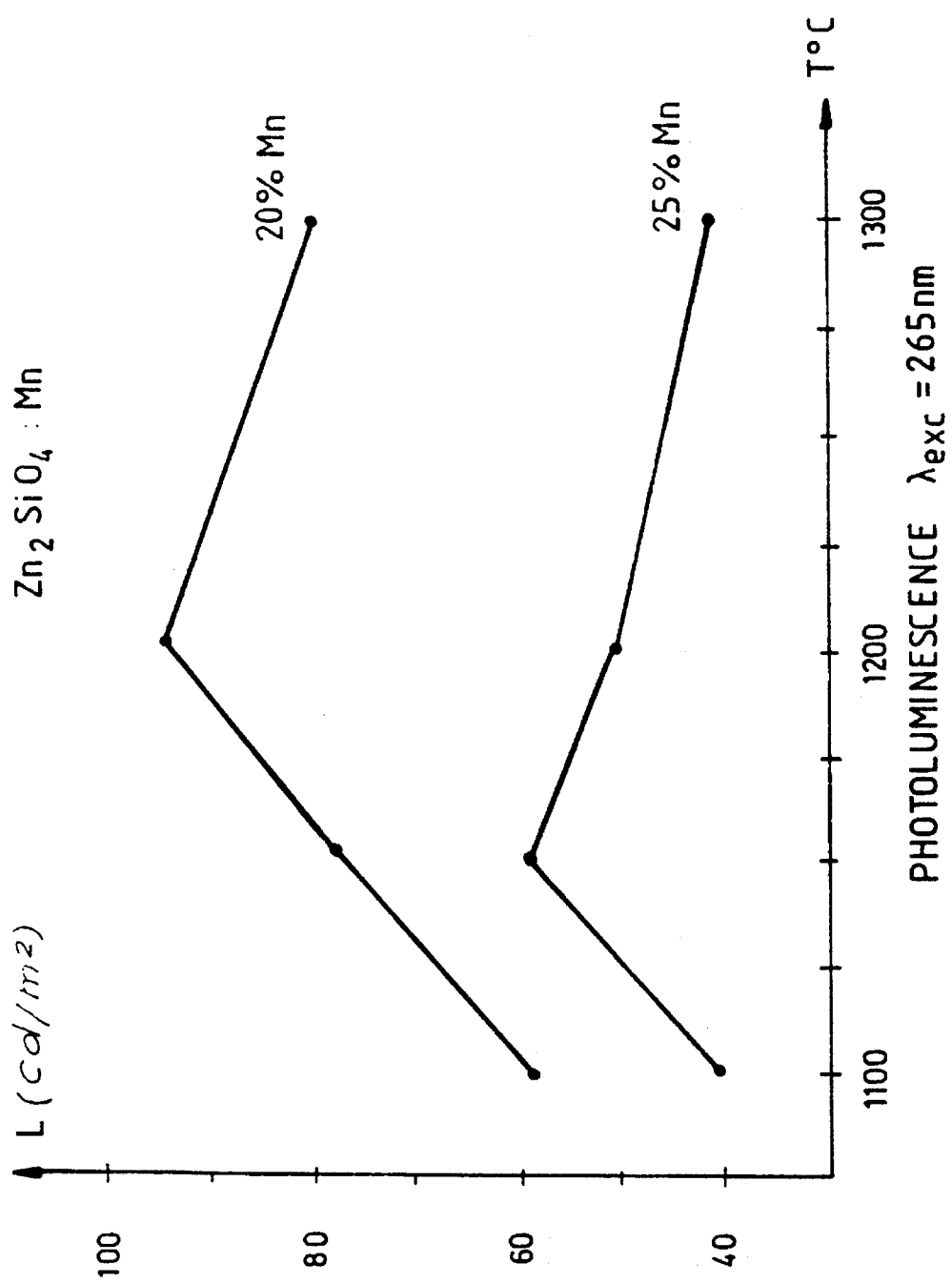
FIG. 6 shows curves of luminance as a function of the temperature of oven treatment.

Another representation of the effect of the temperature of the oven treatment on the luminance is given in FIG. 6 for two doping levels, 20% and 25%. The optimum values are obtained for T°C=1200° C. and 1150° C. respectively.

Figure 7:
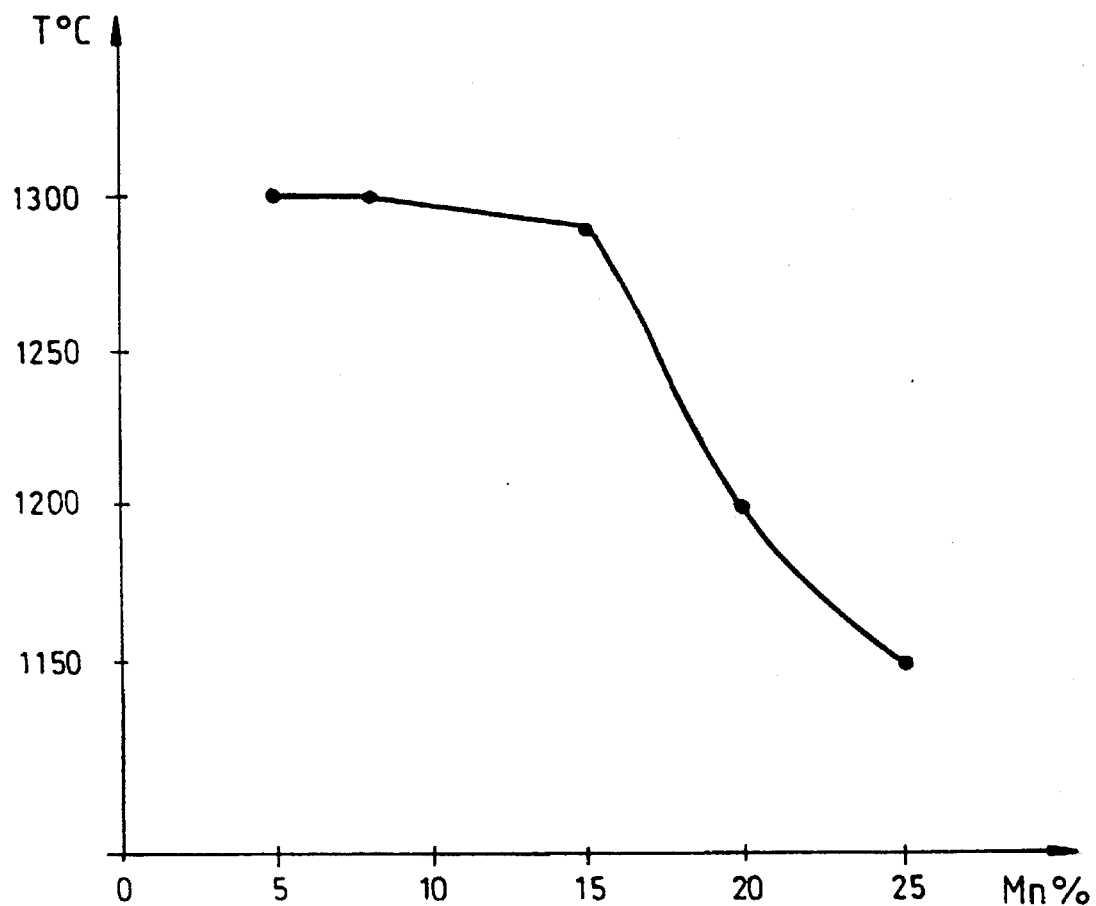
FIG. 7 shows a curve of optimum temperatures of oven treatment as a function of the doping levels.

Finally, FIG. 7 gives the variation of the optimum temperature of oven treatment for various values of manganese content. The temperature goes from 1300° C. - 4 h for x=5% to 1150° C. - 4 h for x=25%.

It can be seen in this figure that the temperature of oven temperature is located in the region of:

1300° C. for a manganese content between 0% and 15%;

1200° C. for a manganese content between 15% and 20%. This temperature is, more specifically, between 1300° C. and 1150° C., the choice of the temperature being a substantially linear function of the manganese content;

1150° C. for a manganese content between 20% and 25%.

It is seen therefore that, according to the invention, the oven treatment time is a function of the doping level and that this time gets shorter with the rise in the doping level.

It is quite clear that the foregoing description has been given purely by way of a non-restrictive example and that other alternative embodiments may be contemplated without going beyond the scope of the invention.

What is claimed is:

1. A manganese-doped zinc silicate phosphor of the formula $Zn_{2-x}Mn_xSiO_4$, wherein x is about 0.25.

2. The manganese-doped zinc silicate phosphor according to claim 1, wherein said phosphor has a photoluminescence decay time of 1.9 ms.

3. The manganese-doped zinc silicate phosphor according to claim 1, wherein said phosphor has a cathodoluminescent decay time of about 0.7 ms.

4. The manganese-doped zinc silicate phosphor according to claim 1, wherein said phosphor has a photoluminescence of 59 $Cd/m^2$.

5. A manganese-doped zinc silicate phosphor of the formula $Zn_{2-x}Mn_xSiO_4$, wherein $0.2<x\leq0.25$.

6. The manganese-doped zinc silicate phosphor according to claim 5, wherein said phosphor has a photoluminescence decay time of from about 3.5 ms to 1.9 ms.

7. The manganese-doped zinc silicate phosphor according to claim 5, wherein said phosphor has a cathodoluminescent decay time of from about 1.8 ms to 0.7 ms.

8. The manganese-doped zinc silicate phosphor according to claim 5, wherein said phosphor has a photoluminescence of from 59 to about 94 $Cd/m^2$.

* * * * *